United States Patent
Schmidt et al.

(10) Patent No.: US 12,461,147 B1
(45) Date of Patent: Nov. 4, 2025

(54) REDUCING VOLTAGE DROOPING IN A MICROELECTRONIC CHIP

(71) Applicant: INTERNATIONAL BUSINESS MACHINES CORPORATION, Armonk, NY (US)

(72) Inventors: Hagen Schmidt, Tuebingen (DE); Andreas H. A. Arp, Nufringen (DE); Knut Schuenemann, Weil im Schoenbuch (DE); Simon Büchsenstein, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 18/733,984

(22) Filed: Jun. 5, 2024

(30) Foreign Application Priority Data

May 6, 2024 (GB) ..................... 2406291

(51) Int. Cl.
*G01R 31/3185* (2006.01)
*G06F 1/30* (2006.01)

(52) U.S. Cl.
CPC ..... *G01R 31/318552* (2013.01); *G06F 1/305* (2013.01)

(58) Field of Classification Search
CPC ............ G01R 31/318552; G06F 1/305
USPC .............. 714/731, 744, 726, 729, 727
See application file for complete search history.

(56) References Cited

U.S. PATENT DOCUMENTS

| | | | |
|---|---|---|---|
| 6,449,738 B1* | 9/2002 | Hinedi | G06F 11/2221 714/744 |
| 6,816,990 B2 | 11/2004 | Song | |
| 7,181,664 B2 | 2/2007 | Lee | |
| 7,509,606 B2 | 3/2009 | Chaudhry | |
| 7,839,175 B2* | 11/2010 | Franch | H03K 19/0963 326/97 |
| 7,949,971 B2 | 5/2011 | Ortiz | |
| 7,961,559 B2* | 6/2011 | Dixon | G01R 31/31725 327/284 |
| 9,903,916 B2 | 2/2018 | Sofer | |
| 10,234,505 B1 | 3/2019 | Shivaray | |
| 10,775,435 B1 | 9/2020 | Papameletis et al. | |
| 2004/0095161 A1 | 5/2004 | Campbell | |
| 2009/0051396 A1* | 2/2009 | Shimamoto | H03K 5/135 324/76.62 |
| 2011/0260767 A1 | 10/2011 | Devta-Prasanna et al. | |
| 2013/0271197 A1 | 10/2013 | Sanghani et al. | |

(Continued)

OTHER PUBLICATIONS

Bahl et al., State of the Art Low Capture Power Methodology, 2011, IEEE, pp. 1-10. (Year: 2011).*

(Continued)

*Primary Examiner* — John J Tabone, Jr.
(74) *Attorney, Agent, or Firm* — Stosch Sabo

(57) ABSTRACT

Disclosed are techniques for reducing voltage drooping in a microelectronic chip, including separating a scan data launch clock from a capture clock with a variable time delay depending on a delay of a succeeding scan path of the latches, where the scan data launch clock and the capture clock are based on a base clock signal. The techniques further include analyzing and categorizing the latches against the time delay into dedicated buffer group categories. The techniques further include assigning the at least two local clock buffers to the latches within the dedicated buffer group categories.

20 Claims, 8 Drawing Sheets

(56) References Cited

U.S. PATENT DOCUMENTS

2023/0281365 A1  9/2023  Kazda
2023/0394211 A1  12/2023  Jung

OTHER PUBLICATIONS

Intellectual Property Office, "Patents Act 1977: Search Report under Section 17(5)", Feb. 3, 2025, 3 Pages, GB Application No. 2406291.1.

Chung et al., "Comprehensive Optimization of Scan Chain Timing During Late-Stage IC Implementation," DAC '16: Proceedings of the 53rd Annual Design Automation Conference; Article No. 61; Jun. 5, 2016, pp. 1-6.

* cited by examiner

REDUCING VOLTAGE DROOPING IN A MICROELECTRONIC CHIP

BACKGROUND

The present invention relates in general to data processing systems.

Testability of very large scale integration (VLSI) circuit devices is dependent on power consumption. In particular, power consumption and test time during initial machine load is critical for operating computer systems as well as testing of wafers with a large number of devices-under-test, a device-under-test being any chip tested during manufacturing or already in use in a computer system. In current tests, during a scan all latches of a device-under-test launch their data at the same clock pulse.

U.S. Pat. No. 7,181,664 B2 discloses a "method for reordering a scan chain that meets given constraints and minimizes peak power dissipation. The given constraints include a maximum peak power dissipation, a maximum scan chain length and a maximum distance between two successive registers. The method includes embedding a developed tool into an existing VLSI design flow for low-power circuit designs" (Abstract).

SUMMARY

A computer implemented method for reducing voltage drooping in a microelectronic chip is proposed, the method comprising using at least two local clock buffers to be fed with data by latches, where the at least two local clock buffers are triggered by a base clock signal. The method further includes separating a scan data launch clock from a capture clock with a variable time delay depending on a delay of a succeeding scan path of the latches, where the scan data launch clock and the capture clock are based on the base clock signal. The method further includes analyzing and categorizing the latches against the time delay into dedicated buffer group categories. The method further includes assigning the at least two local clock buffers to the latches within the dedicated buffer group categories.

Further, a microelectronic chip for a computer system is proposed, comprising at least two local clock buffers to be fed with data by latches, where the at least two local clock buffers are triggered by a base clock signal, the local clock buffers providing at least one scan launch control input for determining a time delay of a scan data launch by a scan data launch clock separated from a capture clock with a variable time delay depending on a delay of a succeeding scan path of the latches. The latches are categorized against the time delay into dedicated buffer group categories. The at least two local clock buffers are assigned to the latches within the dedicated buffer group categories.

Further, a computer system including a microelectronic chip is proposed, comprising a computer processing unit storing computer executable instructions to perform the method described above.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments.

DETAILED DESCRIPTION

Figure 1:
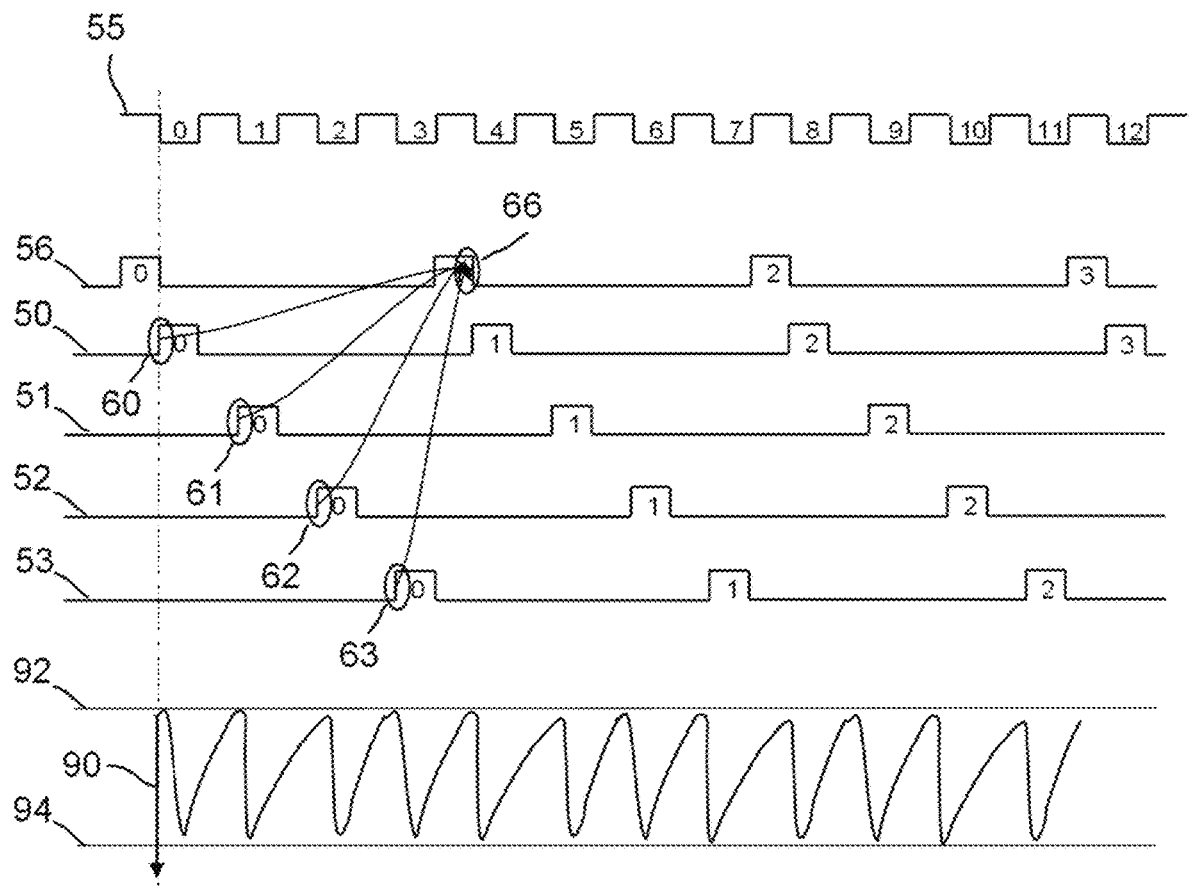
FIG. 1 depicts a scan timing diagram with a cascaded data launch from latches to local clock buffers according to an embodiment of the invention.

The present invention relates in general to data processing systems, in particular, to a computer implemented method for reducing voltage drooping in a microelectronic chip, a microelectronic chip for a computer system and a computer system including a microelectronic chip.

A computer implemented method for reducing voltage drooping in a microelectronic chip is proposed, the method comprising using at least two local clock buffers to be fed with data by latches, wherein the at least two local clock buffers are triggered by a base clock signal; separating a scan data launch clock from a capture clock with a variable time delay depending on a delay of a succeeding scan path of the latches, wherein the scan data launch clock and the capture clock are based on the base clock signal; analyzing and categorizing the latches against the time delay into dedicated buffer group categories; assigning the at least two local clock buffers to the latches within the dedicated buffer group categories.

The time delay of the scan path of the latches mentioned is a clock or cycle delay. Latches are clocked memory elements or registers. This means that each latch stage (in a pipeline) delays the scan data launch by one clock/cycle. Thus, the time delay of a latch is defined by the placement of the latch in the layout of the microelectronic chip and the corresponding scan path.

During operating a microelectronic chip data from latches are fed to local clock buffers. Using the proposed method a four-to-one scan timing may be enabled where four cycles of a scan data launch clock are distributed over one cycle of a capture clock. Thus, power drooping as well as high voltage noise peaks during the scan may be reduced as the voltage in a corresponding chip is recovering.

Advantageously, scanning in a microelectronic chip may be performed during an initial machine load or power management.

Favorably, a minimum voltage for a transistor of a chip required to operate during scanning may be lowered, thus improving the power consumption of the chip. The minimum voltage is no longer limited by the scan process and a logical built in self-test (LBIST). Test time and wafer test costs may be reduced.

A minimum needed voltage during a fast array unload or ring dump may advantageously be reduced.

Scanning may be performed during a LBIST where a four-to-one scan timing is used instead of an eight-to-one scan timing, thus improving the minimum needed voltage for the LBIST.

Favorably, a reduced set voltage for a wafer or module test may be used.

In an additional or alternative embodiment of the invention, the latches may be ordered in a dedicated delayed scan hold pipeline, wherein a scan launch control input of the at least two local clock buffers may be connected to the dedicated delayed scan hold pipeline corresponding to the assigned buffer group category. Thus, latches may be fed to appropriate local clock buffers according to an order for minimizing voltage droops.

In an additional or alternative embodiment of the invention, an order of the latches in the delayed scan hold pipeline may be used for implementing the time delay. Favorably, latches may be fed to corresponding local clock buffers according to the order of the assigned buffer group category for minimizing voltage droops.

In an additional or alternative embodiment of the invention, data launched by the at least two local clock buffers from the latches of the delayed scan hold pipeline may be delayed using the scan launch control input of the at least two local clock buffers. Advantageously, a distribution of the data launches over the whole capture data cycle may be enabled.

In an additional or alternative embodiment of the invention, data from the latches of the delayed scan hold pipeline may be launched to the at least two local clock buffers according to the corresponding time delay of the at least two local clock buffers. Favorably, latches may be fed to corresponding local clock buffers according to the order of the assigned buffer group category.

In an additional or alternative embodiment of the invention, data from the latches of the delayed scan hold pipeline may be launched to the at least two local clock buffers in a descending time delay order. This may be favorable implementation for reducing voltage drooping.

In an additional or alternative embodiment of the invention, data of different latches to be launched may be distributed according to the scan data launch clock over a cycle of the capture clock. Thus, data launches may be distributing advantageously for equalizing a power consumption during testing.

In an additional or alternative embodiment of the invention, the distribution of the data to be launched may be based on the buffer group category of the corresponding latch. Spreading of the data launches over a whole capture cycle may thus be enabled.

In an additional or alternative embodiment of the invention, the buffer group categories may be balanced according to at least similar numbers of latches per buffer group category. Thus, power consumption may be equalized for reducing voltage droops during scanning the latches.

In an additional or alternative embodiment of the invention, analyzing and categorizing the latches against the time delay into the dedicated buffer group categories at least may comprise determining a scan timing of the latches; assigning the latches to the buffer group category based on their scan timing; if the buffer group categories are balanced, then assigning the latches to the at least two local clock buffers with corresponding scan data launch; if the buffer group categories are unbalanced, assigning at least one of the latches to a buffer group category with a higher time delay, until the buffer group categories are balanced. Thus, power consumption may be equalized for reducing voltage droops during scanning the latches.

Further, a microelectronic chip for a computer system is proposed, comprising at least two local clock buffers to be fed with data by latches, wherein the at least two local clock buffers are triggered by a base clock signal, the local clock buffers providing at least one scan launch control input for determining a time delay of a scan data launch by a scan data launch clock separated from a capture clock with a variable time delay depending on a delay of a succeeding scan path of the latches. The latches are categorized against the time delay into dedicated buffer group categories. The at least two local clock buffers are assigned to the latches within the dedicated buffer group categories.

During operating the proposed microelectronic chip as a device under test data from latches are fed to local clock buffers. For testing a four-to-one scan timing may be enabled where four cycles of a scan data launch clock are distributed over one cycle of a capture clock. Thus, power drooping as well as high voltage noise peaks during the scan may be reduced as the voltage in a corresponding chip is recovering.

Advantageously, scanning in the chip may be performed during an initial machine load or power management.

Favorably, a minimum needed voltage for a transistor of the chip to operate during scanning may be lowered improving the power consumption of the chip. The minimum voltage no longer is limited by the scan process and a logical built in self-test (LBIST). Test time and wafer test costs may be reduced.

A minimum needed voltage during a fast array unload or ring dump may advantageously be reduced.

Scanning may be performed during a LBIST where a four-to-one scan timing is used instead of an eight-to-one scan timing, thus improving the minimum needed voltage for the LBIST.

Favorably, a reduced set voltage for a wafer or module test may be used.

In an additional or alternative embodiment of the invention, the latches may be ordered in a dedicated delayed scan hold pipeline, wherein the at least two local clock buffers may provide a scan hold input which is connected to a part of the dedicated delayed scan hold pipeline of latches with the highest one of the time delays in order to provide the capture clock for the at least two local clock buffers. Thus, latches may be fed to appropriate local clock buffers according to an order for minimizing voltage droops.

In an additional or alternative embodiment of the invention, the latches may be ordered in the dedicated delayed scan hold pipeline implementing the time delay of the latches. Favorably, latches may be fed to corresponding local clock buffers according to the order of the assigned buffer group category for minimizing voltage droops.

In an additional or alternative embodiment of the invention, the scan hold input of the at least two local clock buffers may be configured to capture delayed data from the latches of the delayed scan hold pipeline. Advantageously, a distribution of the data launches over the whole capture data cycle may be enabled, In an additional or alternative embodiment of the invention, the latches of the delayed scan hold pipeline may be connected to the at least two local clock buffers via the scan launch control input according to the corresponding time delay implemented at the at least two local clock buffers.

Favorably, latches may be fed to corresponding local clock buffers according to the order of the assigned buffer group category.

In an additional or alternative embodiment of the invention, the chip may be configured to launch data of different latches distributed according to the scan data launch clock over a cycle of the capture clock. Thus, data launches may be distributing advantageously for equalizing a power consumption during testing.

In an additional or alternative embodiment of the invention, the distribution of the data to be launched may be based on the buffer group category of the corresponding latch. Thus, data launches may be distributing advantageously for equalizing a power consumption during testing.

In an additional or alternative embodiment of the invention, the buffer group categories may be balanced according to at least similar numbers of latches per buffer group category. Thus, power consumption may be equalized for reducing voltage droops during scanning the latches.

In an additional or alternative embodiment of the invention, the latches of the delayed scan hold pipeline may be connected to the at least two local clock buffers in a descending time delay order. This may be favorable implementation for reducing voltage drooping.

Further, a computer system including a microelectronic chip is proposed, comprising a computer processing unit storing computer executable instructions to perform the method described above.

During operating the proposed computer system with the microelectronic chip as a device under test data from latches are fed to local clock buffers. For testing a four-to-one scan timing may be enabled where four cycles of a scan data launch clock are distributed over one cycle of a capture clock. Thus, power drooping as well as high voltage noise peaks during the scan may be reduced as the voltage in a corresponding chip is recovering.

Advantageously, scanning in the chip may be performed during an initial machine load or power management.

Favorably, a minimum needed voltage for a transistor of the chip to operate during scanning may be lowered improving the power consumption of the chip. The minimum voltage no longer is limited by the scan process and a logical built in self-test (LBIST). Test time and wafer test costs may be reduced.

A minimum needed voltage during a fast array unload or ring dump may advantageously be reduced.

Scanning may be performed during a LBIST where a four-to-one scan timing is used instead of an eight-to-one scan timing, thus improving the minimum needed voltage for the LBIST.

Favorably, a reduced set voltage for a wafer or module test may be used.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a computer implemented method for reducing voltage drooping in a microelectronic chip. The method comprises using at least two local clock buffers to be fed with data by latches, wherein the at least two local clock buffers are triggered by a base clock signal; separating a scan data launch clock from a capture clock with a variable time delay depending on a delay of a succeeding scan path of the latches, wherein the scan data launch clock and the capture clock are based on the base clock signal; analyzing and categorizing the latches against the time delay into dedicated buffer group categories; assigning the at least two local clock buffers to the latches within the dedicated buffer group categories.

The illustrative embodiments may further be used for a microelectronic chip for a computer system, comprising at least two local clock buffers to be fed with data by latches, wherein the at least two local clock buffers are triggered by a base clock signal. The local clock buffers provide at least one scan launch control input for determining a time delay of a scan data launch by a scan data launch clock separated from a capture clock with a variable time delay depending on a time delay of a succeeding scan path of the latches. The latches are categorized against the time delay into dedicated buffer group categories. The at least two local clock buffers are assigned to the latches within the dedicated buffer group categories.

Figure 2:
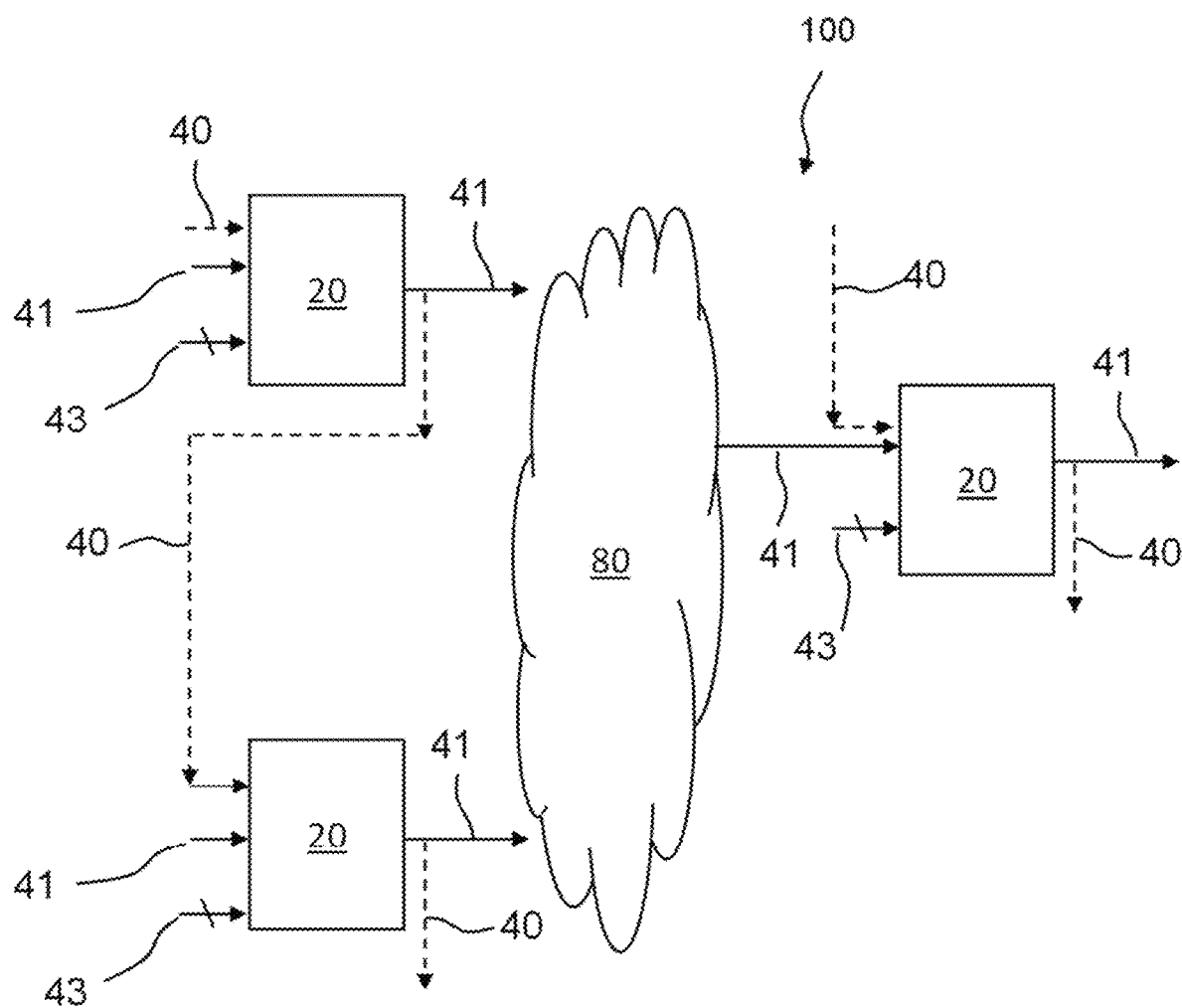
FIG. 2 depicts an arrangement of latches connected by a logic circuitry.
Figure 5:
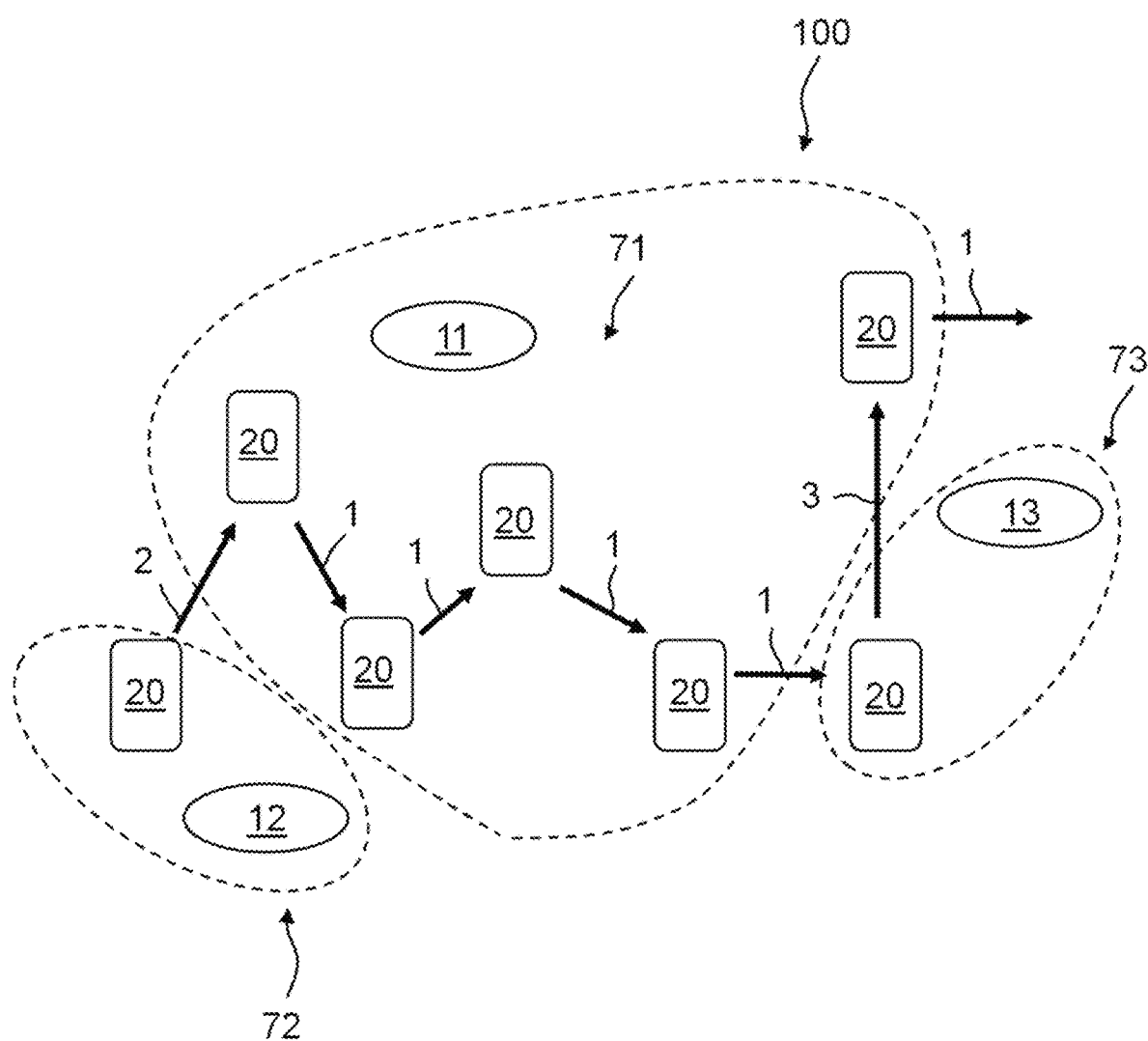
FIG. 5 depicts the arrangement of latches assigned to buffer group categories according to their time delays.
Figure 6:
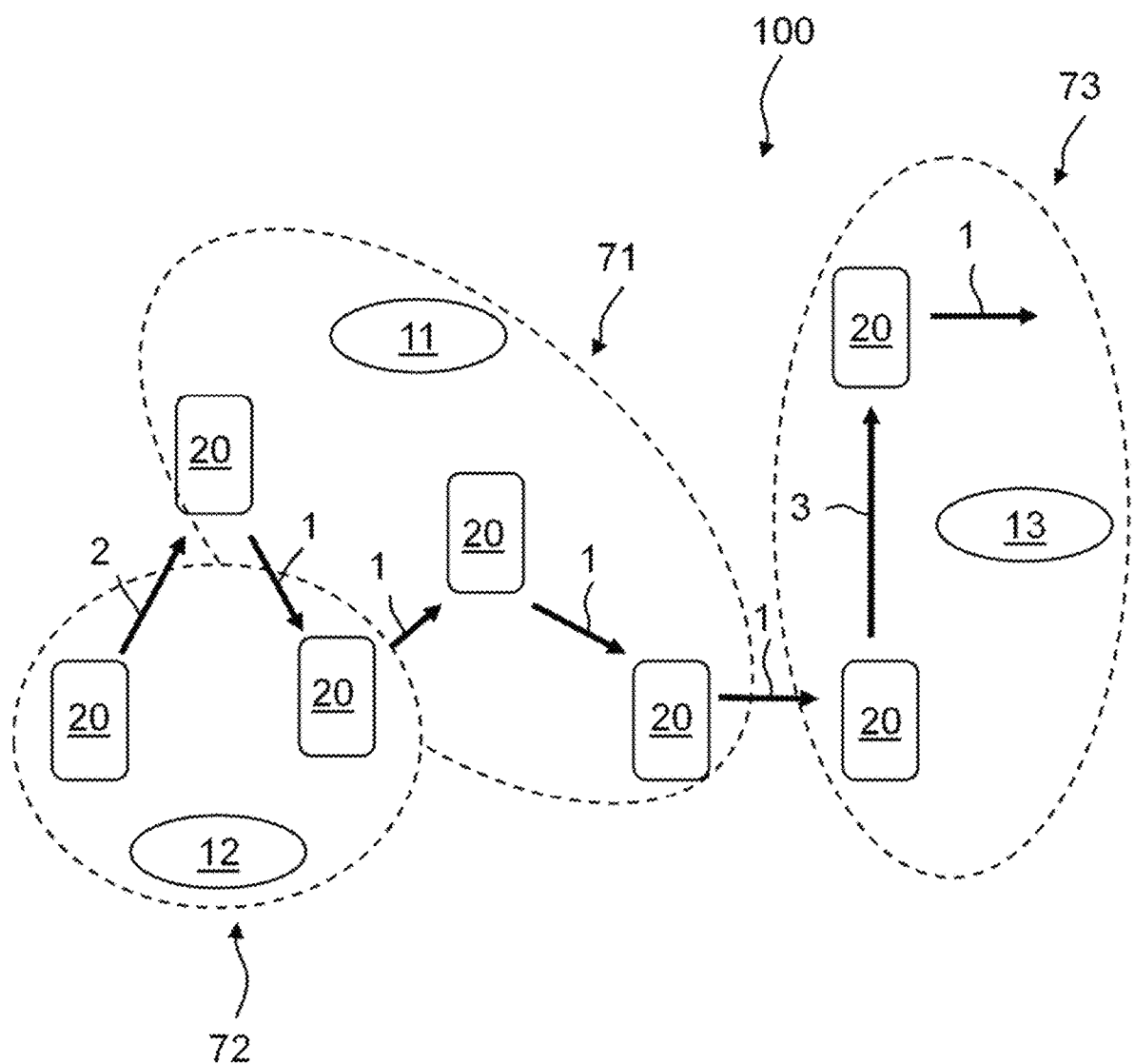
FIG. 6 depicts the arrangement of latches assigned to balanced buffer group categories according to an embodiment of the invention.
Figure 7:
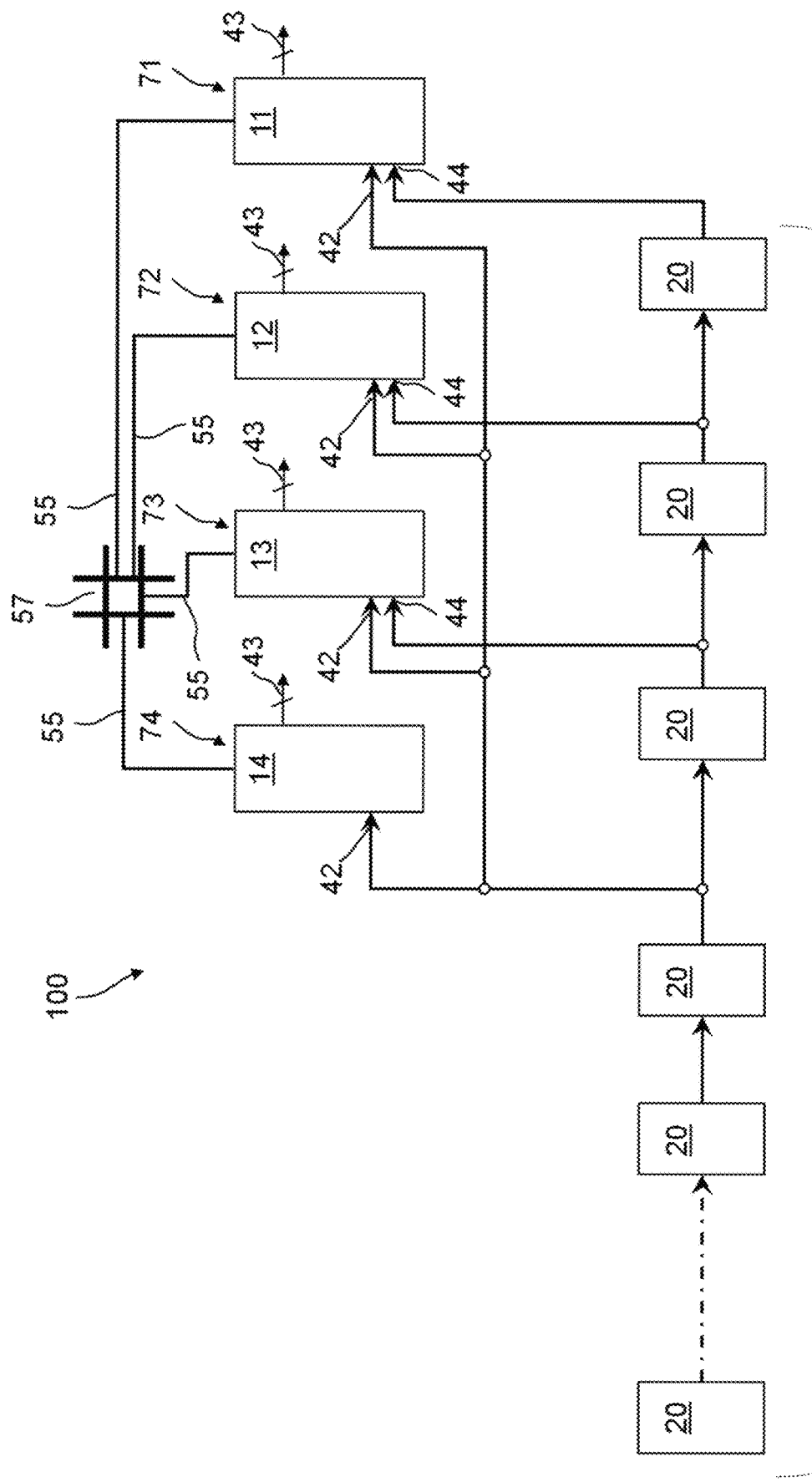
FIG. 7 depicts a delayed scan hold pipeline connected to local clock buffers implementing the buffer group categories according to an embodiment of the invention.

FIG. 1 depicts a scan timing diagram with a cascaded data launch from latches 20 to local clock buffers 11, 12, 13, 14 (as shown in FIGS. 5 to 7) according to an embodiment of the invention. In FIG. 2 an arrangement of latches 20 connected by a logic circuitry 80 is depicted.

For operating a microelectronic chip 100, e.g., at least two local clock buffers 11, 12, 13, 14 are fed with data by latches 20. The at least two local clock buffers 11, 12, 13, 14 are triggered by a base clock signal 55. The base clock signal 55 may be configured e.g. in a clock grid 57 (FIG. 7) or a clock tree. The data are launched from the latches 20 triggered by corresponding scan data launch clocks 50, 51, 52, 53 and received by a local clock buffer 11, 12, 13, 14 triggered by a capture clock 56. Scan data launch clocks 50, 51, 52, 53 as well as capture clock 56 are synchronized with a base clock signal 55.

According to the proposed method, the data of different latches 20 are triggered by the corresponding scan data launch clocks 50, 51, 52, 53 distributed over a cycle of the capture clock 56 at separate different scan and data launches 60, 61, 62, 63. The data are received at the scan capture 66 with the next capture clock 56 pulse.

In FIG. 1 a voltage 90 is also depicted. The voltage 90 starts with a set voltage 92. At each scan data launch 60, 61, 62, 63, the voltage 90 droops and rises again until the next scan data launch 60, 61, 62, 63. The scan data launches 60, 61, 62, 63 are separated in time according to the pulses of the scan data launch clocks 50, 51, 52, 53.

Single current demand on the first cycle for launching the data will spread now over four cycles of the base clock signal 55 resulting in much lower voltage droops in contrast to current state of the art. The voltage droops essentially remain the same for each scan data launches 60, 61, 62, 63. Thus, a minimum voltage 94 for activating transistors of the latches 20 is reduced with respect to state of the art implementations.

FIG. 2 depicts three latches 20 as part of a microelectronic chip 100, connected by a logic circuitry 80. The set of latch clocks 43 comprises three types of clock signals, the logic clocks (could be a single clock or dedicated launch and capture logic clocks), the scan launch clock, and the scan capture clock. All three types of latch clocks are derived from the base clock signal 55 and operate in their respective mode. In functional mode the logic clock triggers the data launch and more importantly the data capture through the data paths 41. In scan mode the scan launch clock triggers the data launch while the scan capture clock captures the data through the scan paths 40.

According to the proposed method, the scan data launch clock 50, 51, 52, 53 is separated from the capture clock 56 with a variable time delay 1, 2, 3, 4 depending on a delay of a succeeding scan path 40 of the latches 20. The latches 20 are analyzed and categorized against the time delay 1, 2, 3, 4 into dedicated buffer group categories 71, 72, 73, 74 (as shown in FIGS. 5 to 7). Next the at least two local clock buffers 11, 12, 13, 14 are assigned to the latches 20 within the dedicated buffer group categories 71, 72, 73, 74.

As shown in FIG. 1, data of different latches 20 to be launched are distributed according to the scan data launch clock 50, 51, 52, 53 over a cycle of the capture clock 56. The distribution of the data to be launched is based on the buffer group category 71, 72, 73, 74 of the corresponding latch 20. For this purpose, the buffer group categories 71, 72, 73, 74 are balanced according to at least similar numbers of latches 20 per buffer group category 71, 72, 73, 74.

Figure 3:
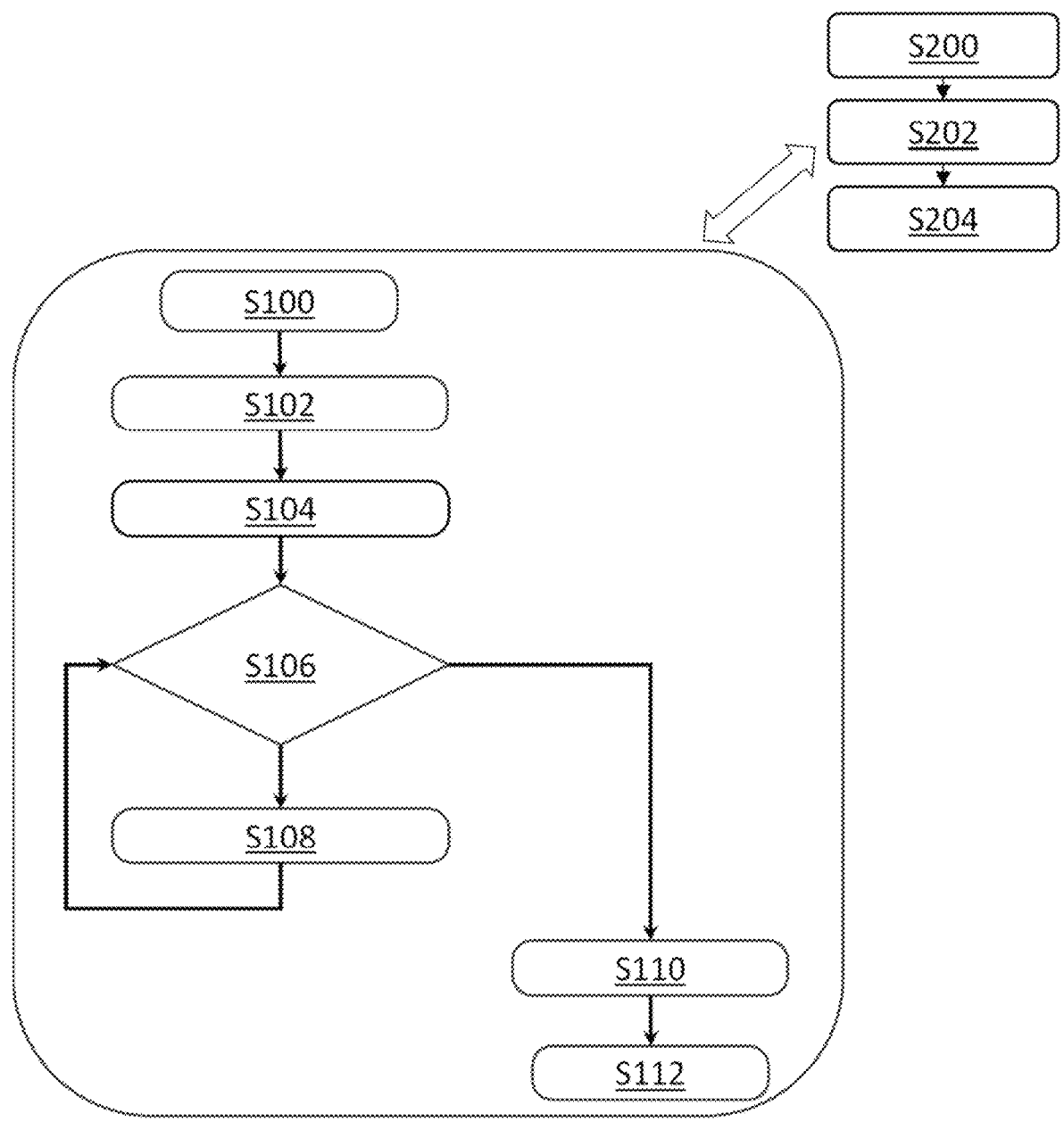
FIG. 3 depicts a flow diagram for assigning latches to dedicated buffer group categories according to an embodiment of the invention.

This is shown in FIG. 3, where a flow diagram for assigning latches to dedicated buffer group categories according to an embodiment of the invention is depicted.

Analyzing and categorizing the latches 20 against the time delay 1, 2, 3, 4 into the dedicated buffer group categories 71, 72, 73, 74 starts with step S100.

First in step S102 a delay of a scan path 40 of the latches 20 is determined.

Then the latches 20 are assigned to the buffer group category 71, 72, 73, 74 based on their scan timing in step S104.

In step S106 it is checked if the buffer group categories 71, 72, 73, 74 are balanced concerning a number of latches 20 in each buffer group category 71, 72, 73, 74.

If this is the case, then in step S110 the latches 20 are assigned to the at least two local clock buffers 11, 12, 13, 14 with corresponding buffer group categories 71, 72, 73, 74 and the data scan is launched obeying the clock gating as well as functional timing.

If the buffer group categories 71, 72, 73, 74 are unbalanced, in step S108 at least one of the latches 20 is assigned to a buffer group category 71, 72, 73, 74 with a higher time delay 1, 2, 3, 4. This check is repeated until the buffer group categories 71, 72, 73, 74 are balanced.

The program flow ends with step S112.

Assigning latches to dedicated buffer group categories as shown in the flow diagram is part of the general physical design flow of the microelectronic chip 100 and is performed in a latch to local clock buffer clustering step S202 of the current chip physical design flow. This step S202 is preceded by the initial placement steps S200 of the physical design flow where the general layout of the chip is designed by placing the standard cells of the chip inside a core boundary. Here a global placement in which a tool determines the approximate location of each cell according to the timing, congestion, and multi-voltage constraints may be executed. The step S202 is followed by a so-called placement legalization step S204. In the global placement stage, the instances are left with overlap. In step S204, the tool will move the instances in nearby places to overcome the overlap. To match the proper power pins like the VDD pin of a standard cell should be on the VDD rail and VSS on VSS rail and for that if the flipping of instance is required tool also do the flipping. This process is called legalization. After this step, every instance should be placed in a legal location and there should be no overlaps. This step is also called refine placement.

Figure 4:
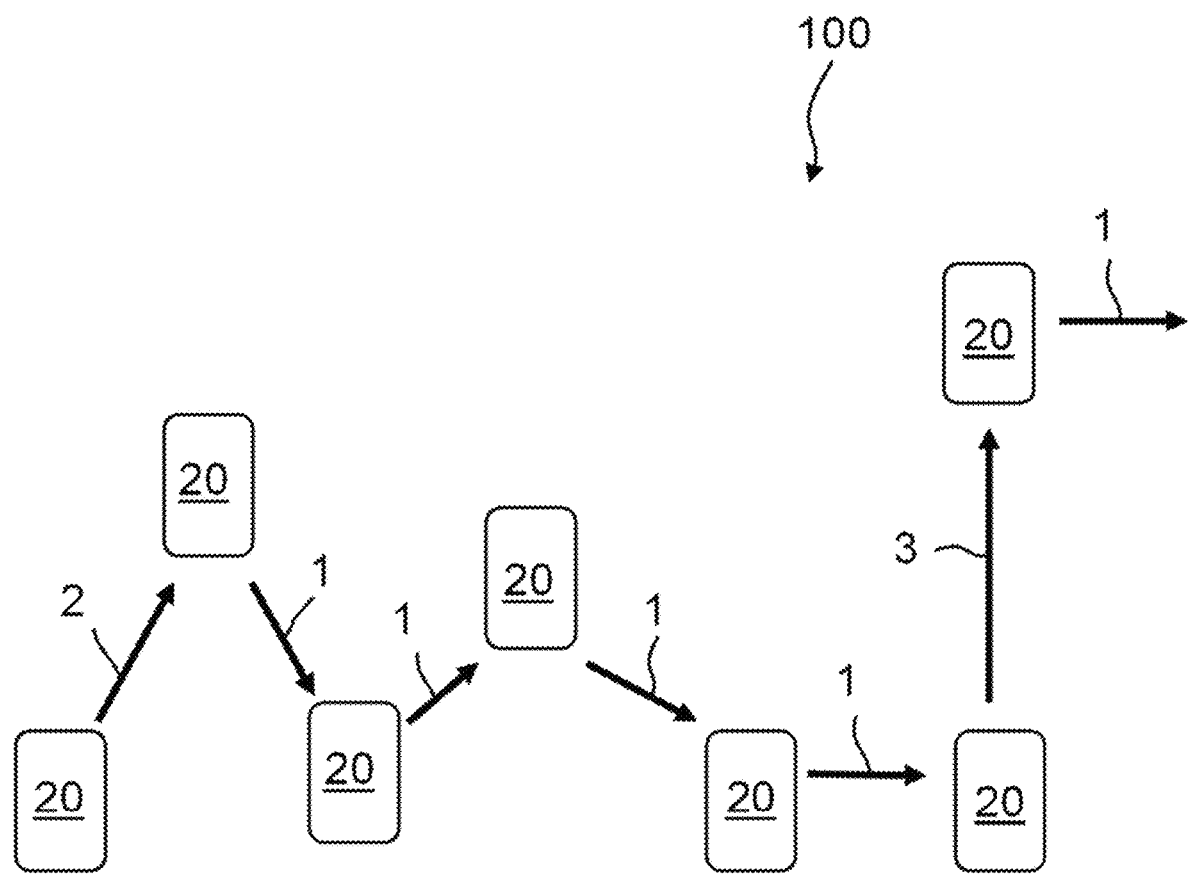
FIG. 4 depicts an arrangement of latches with different time delays.

The balancing process of the buffer group category 71, 72, 73, 74 is visualized in FIGS. 4 to 6.

FIG. 4 depicts an arrangement of latches 20 with different time delays 1, 2, 3. Hereby, the number of the reference sign of the time delay 1, 2, 3 corresponds to a value of the time delay of 1, 2, 3 in order to ease understanding.

First, the latches 20 are assigned to buffer group categories 71, 72, 73, 74 as is depicted in FIG. 5. Local clock buffers 11, 12, 13 are shown within their corresponding buffer group category 71, 72, 73 and assigned latches 20.

The latches 20 are assigned according to their time delay 1, 2, 3. A latch 20 with a time delay of 1 is assigned to the first buffer group category 71, a latch 20 with a time delay of 2 is assigned to the second buffer group category 72 and a latch 20 with time delay of 3 is assigned to the third buffer group category 73.

Thus, the first buffer group category 71 contains five latches 20, the second buffer group category 72 contains one latch 20 and the third buffer group category 73 contains one latch 20, too.

Next, the buffer group categories 71, 72, 73 are balanced as is shown in FIG. 6.

For this purpose, some latches 20 are taken out of the first buffer group category 71 and assigned to the second buffer group category 72 or the third buffer group category 73. So, at the end, the first buffer group category 71 contains three latches 20, the second buffer group category 72 contains two latches 20 and the third buffer group category 73 contains two latches 20, too.

FIG. 7 depicts part of the microelectronic chip 100 to be under test with a delayed scan hold pipeline 30 connected to local clock buffers 11, 12, 13, 14 implementing the buffer group categories 71, 72, 73, 74 according to an embodiment of the invention.

For implementing the proposed method, the latches 20 are ordered in a dedicated delayed scan hold pipeline 30, connected to local clock buffers implementing the buffer group categories 71, 72, 73, 74, as is shown in FIG. 7. The chip is configured to launch data of different latches 20 distributed according to the scan data launch clock 50, 51, 52, 53 over a cycle of the capture clock 56.

The delayed scan hold pipeline 30 comprises a number of ordered latches 20 one following the other.

Four local clock buffers 11, 12, 13, 14 are shown in the embodiment, representing a time delay of 1, 2, 3, 4, respectively. Corresponding buffer group categories 71, 72, 73, 74 assigned to the local clock buffers 11, 12, 13, 14 are also marked in FIG. 7. The buffer group categories 71, 72, 73, 74 are balanced according to at least similar numbers of latches 20 per buffer group category 71, 72, 73, 74. The local clock buffers 11, 12, 13, 14 are triggered by the base clock signal 55 provided by a clock grid 57.

The local clock buffers 11, 12, 13, 14 provide at least one separated scan launch control input 44 for determining a time delay of a scan data launch by the scan data launch clock 50, 51, 52, 53 separated from a capture clock 56 with a variable time delay 1, 2, 3, 4 depending on a time delay of a succeeding scan path 40 of the latches 20.

The scan launch control input 44 of the local clock buffers 11, 12, 13, 14 is connected to the dedicated delayed scan hold pipeline 30 corresponding to the assigned buffer group category 71, 72, 73, 74. The scan launch control input 44 of the at least two local clock buffers 11, 12, 13, 14 is configured to provide delayed scan launch clocks from the latches 20 of the delayed scan hold pipeline 30.

Further, the at least two local clock buffers 11, 12, 13, 14 provide a scan hold input 42 which is connected to a part of the dedicated delayed scan hold pipeline 30 of latches 20 with the highest one of the time delays 1, 2, 3, 4 in order to provide the capture clock 56 for the at least two local clock buffers 11, 12, 13, 14.

Latch clocks 43 as described in FIG. 2 are provided by the at least two local clock buffers 11, 12, 13, 14.

The latches 20 of the delayed scan hold pipeline 30 are ordered in the dedicated delayed scan hold pipeline 30 implementing the time delay 1, 2, 3, 4 of the latches 20. The latches 20 are connected to the local clock buffers 11, 12, 13, 14 via the scan launch control input 44 according to the corresponding time delay 1, 2, 3, 4 implemented at the at least two local clock buffers 11, 12, 13, 14.

By this way, data launched by the local clock buffers 11, 12, 13, 14 from the latches 20 of the delayed scan hold pipeline 30 are delayed using the scan launch control input 44 of the local clock buffers 11, 12, 13, 14.

Thus, data from the latches 20 of the delayed scan hold pipeline 30 may be launched to the local clock buffers 11, 12, 13, 14 according to the corresponding time delay 1, 2, 3, 4 of the local clock buffers 11, 12, 13, 14.

As is shown in FIG. 7 by the following order of the local clock buffers 11, 12, 13, 14 as well as the corresponding buffer group category 71, 72, 73, 74, data from the latches 20 of the delayed scan hold pipeline 30 are launched to the local clock buffers 11, 12, 13, 14 in a descending time delay order. The latches 20 of the delayed scan hold pipeline 30 are connected to the local clock buffers 11, 12, 13, 14 in the descending time delay order.

Thus, the distribution of the data to be launched is based on the buffer group category 71, 72, 73, 74 of the corresponding latch 20.

The microelectronic chip 100 part of which is depicted with the embodiment shown, may favorably be included in a computer system, comprising a computer processing unit storing computer executable instructions to perform the proposed method.

Figure 8:
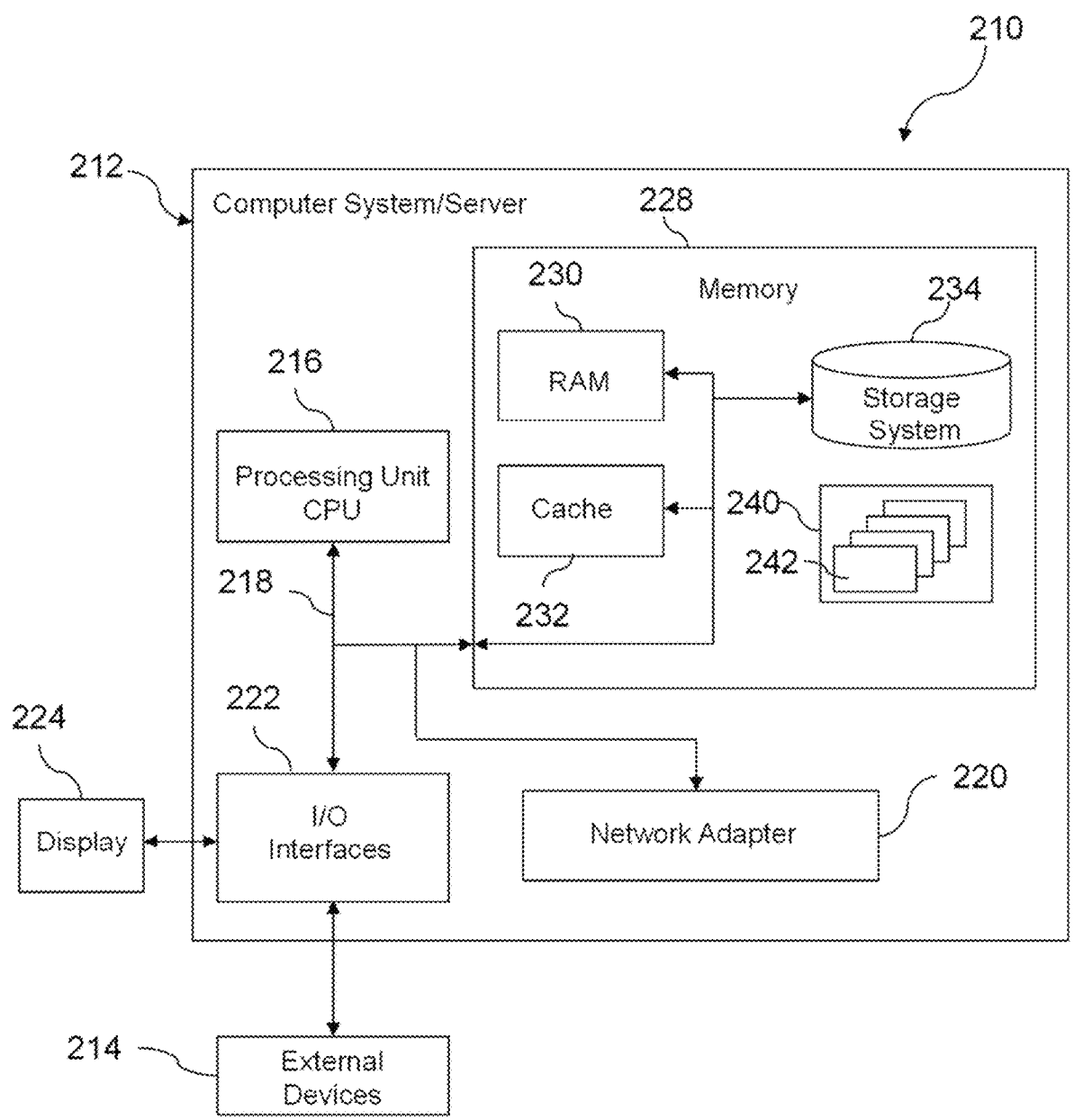
FIG. 8 depicts an example embodiment of a data processing system for executing a method according to the invention.

According to a further embodiment of the invention, a data processing system 210 is depicted in FIG. 8. The system 210 may at least comprise a memory 228; and a processing unit 216 communicatively coupled to the memory 228. The data processing system 210 may perform a method as described above. In order to avoid unnecessary repetitions it will be referred to the description of the computer implemented method explained with FIGS. 1 to 7.

Referring now to FIG. 8, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further exemplary embodiments of the present disclosure are set out in the following numbered clauses:

Numbered clause 1: A computer implemented method for reducing voltage drooping in a microelectronic chip (100), the method comprising
  using at least two local clock buffers (11, 12, 13, 14) to be fed with data by latches (20), wherein the at least two local clock buffers (11, 12, 13, 14) are triggered by a base clock signal (55);
  separating a scan data launch clock (50, 51, 52, 53) from a capture clock (56) with a variable time delay (1, 2, 3, 4) depending on a delay of a succeeding scan path (40) of the latches (20), wherein the scan data launch clock (50, 51, 52, 53) and the capture clock (56) are based on the base clock signal (55);
  analyzing and categorizing the latches (20) against the time delay (1, 2, 3, 4) into dedicated buffer group categories (71, 72, 73, 74);
  assigning the at least two local clock buffers (11, 12, 13, 14) to the latches (20) within the dedicated buffer group categories (71, 72, 73, 74).

Numbered clause 2: The method according to clause 1, wherein the latches (20) are ordered in a dedicated delayed scan hold pipeline (30), wherein a scan launch control input (44) of the at least two local clock buffers (11, 12, 13, 14) is connected to the dedicated delayed scan hold pipeline (30) corresponding to the assigned buffer group category (71, 72, 73, 74).

Numbered clause 3: The method according to clause 2, wherein an order of the latches (20) in the delayed scan hold pipeline (30) is used for implementing the time delay (1, 2, 3, 4).

Numbered clause 4: The method according to clause 2 or 3, wherein data launched by the at least two local clock buffers (11, 12, 13, 14) from the latches (20) of the delayed scan hold pipeline (30) are delayed using the scan launch control input (44) of the at least two local clock buffers (11, 12, 13, 14).

Numbered clause 5: The method according to any one of clauses 2 to 4, wherein data from the latches (20) of the delayed scan hold pipeline (30) are launched to the at least two local clock buffers (11, 12, 13, 14) according to the corresponding time delay (1, 2, 3, 4) of the at least two local clock buffers (11, 12, 13, 14).

Numbered clause 6: The method according to any one of clauses 2 to 5, wherein data from the latches (20) of the delayed scan hold pipeline (30) are launched to the at least two local clock buffers (11, 12, 13, 14) in a descending time delay order.

Numbered clause 7: The method according to any one of clauses 1 to 6, wherein data of different latches (20) to be launched are distributed according to the scan data launch clock (50, 51, 52, 53) over a cycle of the capture clock (56).

Numbered clause 8: The method according to clause 7, wherein the distribution of the data to be launched is based on the buffer group category (71, 72, 73, 74) of the corresponding latch (20).

Numbered clause 9: The method according to any one of clauses 1 to 8, wherein the buffer group categories (71, 72, 73, 74) are balanced according to at least similar numbers of latches (20) per buffer group category (71, 72, 73, 74).

Numbered clause 10: The method according to any one of clauses 1 to 9, wherein analyzing and categorizing the latches (20) against the time delay (1, 2, 3, 4) into the dedicated buffer group categories (71, 72, 73, 74) at least comprises
  determining a scan timing of the latches (20);
  assigning the latches (20) to the buffer group category (71, 72, 73, 74) based on their scan timing;
  if the buffer group categories (71, 72, 73, 74) are balanced, then assigning the latches (20) to the at least two local clock buffers (11, 12, 13, 14) with corresponding scan data launch;
  if the buffer group categories (71, 72, 73, 74) are unbalanced, assigning at least one of the latches (20) to a buffer group category (71, 72, 73, 74) with a higher time delay (1, 2, 3, 4), until the buffer group categories (71, 72, 73, 74) are balanced.

Numbered clause 11: A microelectronic chip (100) for a computer system comprising
  at least two local clock buffers (11, 12, 13, 14) to be fed with data by latches (20), wherein the at least two local clock buffers (11, 12, 13, 14) are triggered by a base clock signal (55),
  the local clock buffers (11, 12, 13, 14) providing at least one scan launch control input (44) for determining a time delay (1, 2, 3, 4) of a scan data launch by a scan data launch clock (50, 51, 52, 53) separated from a capture clock (56) with a variable time delay (1, 2, 3, 4) depending on a delay of a succeeding scan path (40) of the latches (20),
  wherein the latches (20) are categorized against the time delay (1, 2, 3, 4) into dedicated buffer group categories (71, 72, 73, 74),
  wherein the at least two local clock buffers (11, 12, 13, 14) are assigned to the latches (20) within the dedicated buffer group categories (71, 72, 73, 74).

Numbered clause 12: The chip according to clause 11, wherein the latches (20) are ordered in a dedicated delayed scan hold pipeline (30), wherein the at least two local clock buffers (11, 12, 13, 14) provide a scan hold input (42) which is connected to a part of the dedicated delayed scan hold pipeline (30) of latches (20) with the highest one of the time delays (1, 2, 3, 4) in order to provide the capture clock (56) for the at least two local clock buffers (11, 12, 13, 14).

Numbered clause 13: The chip according to clause 12, wherein the latches (20) are ordered in the dedicated delayed scan hold pipeline (30) implementing the time delay (1, 2, 3, 4) of the latches (20).

Numbered clause 14: The chip according to clause 12 or 13, wherein the scan hold input (42) of the at least two local clock buffers (11, 12, 13, 14) is configured to capture delayed data from the latches (20) of the delayed scan hold pipeline (30).

Numbered clause 15: The chip according to any one of clauses 12 to 14, wherein the latches (20) of the delayed scan hold pipeline (30) are connected to the at least two local clock buffers (11, 12, 13, 14) via the scan launch control input (44) according to the corresponding time delay (1, 2, 3, 4) implemented at the at least two local clock buffers (11, 12, 13, 14).

Numbered clause 16: The chip according to any one of clauses 11 to 15, being configured to launch data of different latches (20) distributed according to the scan data launch clock (50, 51, 52, 53) over a cycle of the capture clock (56).

Numbered clause 17: The chip according to clause 16, wherein the distribution of the data to be launched is based on the buffer group category (71, 72, 73, 74) of the corresponding latch (20).

Numbered clause 18: The chip according to any one of clauses 11 to 17, wherein the buffer group categories (71, 72, 73, 74) are balanced according to at least similar numbers of latches (20) per buffer group category (71, 72, 73, 74).

Numbered clause 19: The chip according to any one of clauses 11 to 18, wherein the latches (20) of the delayed scan hold pipeline (30) are connected to the at least two local clock buffers (11, 12, 13, 14) in a descending time delay order.

Numbered clause 20: A computer system including a microelectronic chip (100) according to any one of clauses 11 to 19, comprising a computer processing unit storing computer executable instructions to perform the method of any one of clauses 1 to 10.

REFERENCE NUMERALS 1 time delay
2 time delay
3 time delay
4 time delay
11 local clock buffer
12 local clock buffer
13 local clock buffer
14 local clock buffer
20 latch
30 delayed scan hold pipeline
40 scan path
41 data path
42 scan hold input
43 latch clocks
44 scan launch control input
50 scan data launch clock
51 scan data launch clock
52 scan data launch clock
53 scan data launch clock
55 base clock signal
56 capture clock
57 clock grid
60 scan and data launch
61 scan and data launch
62 scan and data launch
63 scan and data launch
66 scan capture
71 buffer group category
72 buffer group category
73 buffer group category
74 buffer group category
80 logic circuitry
90 voltage
92 set voltage
94 minimum voltage
100 chip
210 data processing system
212 computer system/server
214 external devices
216 CPU/data processing unit
218 IO Bus
220 network adapter
222 IO interfaces
224 display
228 memory
230 RAM
232 cache
234 storage system
240 program/utility
242 program modules
S100 Start
S102 determine scan timing
S104 assign latches to buffer group categories
S106 check if buffer group categories are balanced
S108 assign latches to buffer group category with higher time delay
S110 assign latches to local clock buffer
S112 End
S200 initial placement step
S202 latch to local clock buffer clustering
S204 placement legalization

The invention claimed is:

1. A computer implemented method for reducing voltage drooping in a microelectronic chip, the method comprising:
using at least two local clock buffers to be fed with data by latches, wherein the at least two local clock buffers are triggered by a base clock signal;
separating a scan data launch clock from a capture clock with a variable time delay depending on a delay of a succeeding scan path of the latches, wherein the scan data launch clock and the capture clock are based on the base clock signal;
analyzing and categorizing the latches against the time delay into dedicated buffer group categories; and
assigning the at least two local clock buffers to the latches within the dedicated buffer group categories.

2. The method according to claim 1, wherein the latches are ordered in a dedicated delayed scan hold pipeline, wherein a scan launch control input of the at least two local clock buffers is connected to the dedicated delayed scan hold pipeline corresponding to the assigned buffer group category.

3. The method according to claim 2, wherein an order of the latches in the dedicated delayed scan hold pipeline is used for implementing the time delay.

4. The method according to claim 2, wherein data launched by the at least two local clock buffers from the latches of the dedicated delayed scan hold pipeline are delayed using the scan launch control input of the at least two local clock buffers.

5. The method according to claim 2, wherein data from the latches of the dedicated delayed scan hold pipeline are launched to the at least two local clock buffers according to the corresponding time delay of the at least two local clock buffers.

6. The method according to claim 2, wherein data from the latches of the dedicated delayed scan hold pipeline are launched to the at least two local clock buffers in a descending time delay order.

7. The method according to claim 1, wherein data of different latches to be launched are distributed according to the scan data launch clock over a cycle of the capture clock.

8. The method according to claim 7, wherein the distribution of the data to be launched is based on the buffer group category of a corresponding latch.

9. The method according to claim 1, wherein the buffer group categories are balanced according to at least similar numbers of latches per buffer group category.

10. The method according to claim 1, wherein analyzing and categorizing the latches against the time delay into the dedicated buffer group categories at least comprises:
   determining a scan timing of the latches;
   assigning the latches to the buffer group category based on their scan timing;
   if the buffer group categories are balanced, then assigning the latches to the at least two local clock buffers with corresponding scan data launch; and
   if the buffer group categories are unbalanced, assigning at least one of the latches to a buffer group category with a higher time delay, until the buffer group categories are balanced.

11. A microelectronic chip for a computer system comprising:
   at least two local clock buffers to be fed with data by latches, wherein the at least two local clock buffers are triggered by a base clock signal,
   the local clock buffers providing at least one scan launch control input for determining a time delay of a scan data launch by a scan data launch clock separated from a capture clock with a variable time delay depending on a delay of a succeeding scan path of the latches,
   wherein the latches are categorized against the time delay into dedicated buffer group categories, and
   wherein the at least two local clock buffers are assigned to the latches within the dedicated buffer group categories.

12. The chip according to claim 11, wherein the latches are ordered in a dedicated delayed scan hold pipeline, wherein the at least two local clock buffers provide a scan hold input which is connected to a part of the dedicated delayed scan hold pipeline of latches with the highest one of the time delays in order to provide the capture clock for the at least two local clock buffers.

13. The chip according to claim 12, wherein the latches are ordered in the dedicated delayed scan hold pipeline implementing the time delay of the latches.

14. The chip according to claim 12, wherein the scan hold input of the at least two local clock buffers is configured to capture delayed data from the latches of the dedicated delayed scan hold pipeline.

15. The chip according to claim 12, wherein the latches of the dedicated delayed scan hold pipeline are connected to the at least two local clock buffers via the scan launch control input according to the corresponding time delay implemented at the at least two local clock buffers.

16. The chip according to claim 11, being configured to launch data of different latches distributed according to the scan data launch clock over a cycle of the capture clock.

17. The chip according to claim 16, wherein the distribution of the data to be launched is based on the buffer group category of a corresponding latch.

18. The chip according to claim 11, wherein the buffer group categories are balanced according to at least similar numbers of latches per buffer group category.

19. The chip according to claim 12, wherein the latches of the dedicated delayed scan hold pipeline are connected to the at least two local clock buffers in a descending time delay order.

20. A computer program product for reducing voltage drooping in a microelectronic chip, the computer program product comprising one or more computer readable storage media, and program instructions collectively stored on the one or more computer readable storage media, the program instructions comprising instructions configured to cause one or more processors to perform a method comprising:
   using at least two local clock buffers to be fed with data by latches, wherein the at least two local clock buffers are triggered by a base clock signal;
   separating a scan data launch clock from a capture clock with a variable time delay depending on a delay of a succeeding scan path of the latches, wherein the scan data launch clock and the capture clock are based on the base clock signal;
   analyzing and categorizing the latches against the time delay into dedicated buffer group categories; and
   assigning the at least two local clock buffers to the latches within the dedicated buffer group categories.

* * * * *